US010860332B2

(12) United States Patent
Iyengar et al.

(10) Patent No.: US 10,860,332 B2
(45) Date of Patent: Dec. 8, 2020

(54) MULTICORE FRAMEWORK FOR USE IN PRE-BOOT ENVIRONMENT OF A SYSTEM-ON-CHIP

(71) Applicant: QUALCOMM Incorporated, San Diego, CA (US)

(72) Inventors: Ajay Iyengar, San Diego, CA (US); Yugandhar Narayana, San Diego, CA (US); Dhamim Packer Ali, San Diego, CA (US); Sreenivasulu Reddy Chalamcharla, San Diego, CA (US); Daison Davis Koola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 16/137,226

(22) Filed: Sep. 20, 2018

(65) Prior Publication Data
US 2019/0095220 A1 Mar. 28, 2019

Related U.S. Application Data

(60) Provisional application No. 62/562,738, filed on Sep. 25, 2017.

(51) Int. Cl.
*G06F 9/4401* (2018.01)
*G06F 9/48* (2006.01)
(Continued)

(52) U.S. Cl.
CPC .......... *G06F 9/4406* (2013.01); *G06F 9/4405* (2013.01); *G06F 9/4881* (2013.01);
(Continued)

(58) Field of Classification Search
CPC ...... G06F 9/4406; G06F 9/4405; G06F 9/546; G06F 9/4881; G06F 9/4843; G06F 9/544; G06F 15/7807
See application file for complete search history.

(56) References Cited

U.S. PATENT DOCUMENTS 6,158,000 A   12/2000 Collins et al.
9,753,836 B2   9/2017 Menon et al.
(Continued)

OTHER PUBLICATIONS

International Search Report and Written Opinion—PCT/US2018/052179—ISA/EPO—dated Dec. 12, 2018.

*Primary Examiner* — Nimesh G Patel
(74) *Attorney, Agent, or Firm* — Qualcomm Incorporated

(57) ABSTRACT

Various aspects are described herein. In some aspects, the disclosure provides a method of enabling a multicore framework in a pre-boot environment for a system-on-chip (SoC) comprising a plurality of processors comprising a first processor and a second processor. The method includes initiating, by the first processor, bootup of the SoC into a pre-boot environment. The method further includes scheduling, by the first processor, execution of one or more boot-up tasks by a second processor. The method further includes executing, by the second processor, the one or more boot-up tasks in the pre-boot environment. The method further includes executing, by the first processor, one or more additional tasks in parallel with the second processor executing the one or more boot-up tasks.

21 Claims, 8 Drawing Sheets

(51) Int. Cl.
  *G06F 9/54*  (2006.01)
  *G06F 15/78*  (2006.01)
(52) U.S. Cl.
  CPC .......... *G06F 9/546* (2013.01); *G06F 15/7807*
   (2013.01); *G06F 9/544* (2013.01)

(56) References Cited

U.S. PATENT DOCUMENTS

| | | | |
|---|---|---|---|
| 9,996,142 | B2 | 6/2018 | Bulusu et al. |
| 2003/0009654 | A1* | 1/2003 | Nalawadi .............. G06F 9/4401 713/1 |
| 2005/0273540 | A1* | 12/2005 | Whaley ................... G06F 13/24 710/260 |
| 2007/0283137 | A1 | 12/2007 | Ueltschey et al. |
| 2014/0053003 | A1* | 2/2014 | Moyer .................. G06F 21/556 713/300 |
| 2014/0094198 | A1* | 4/2014 | Heo .................. H04W 52/0274 455/456.4 |
| 2014/0201411 | A1* | 7/2014 | Kumar .................. G06F 9/4418 710/262 |
| 2015/0106609 | A1 | 4/2015 | Koszek et al. |
| 2015/0199520 | A1* | 7/2015 | Woolley ................ G06F 21/575 713/2 |
| 2015/0205619 | A1* | 7/2015 | Kato .................... G06F 9/4411 713/2 |
| 2016/0124569 | A1* | 5/2016 | Sunwoo ................ G06F 3/1438 345/173 |
| 2016/0253501 | A1 | 9/2016 | Wynn |
| 2017/0249002 | A1 | 8/2017 | Costa et al. |
| 2018/0096151 | A1* | 4/2018 | Ghetie .................... G06F 21/72 |
| 2018/0253314 | A1 | 9/2018 | Packer et al. |

* cited by examiner

MULTICORE FRAMEWORK FOR USE IN PRE-BOOT ENVIRONMENT OF A SYSTEM-ON-CHIP

CROSS-REFERENCE TO RELATED APPLICATIONS

This application claims the benefit of U.S. Provisional Patent No. 62/562,738, filed Sep. 25, 2017. The content of the provisional application is hereby incorporated by reference in its entirety.

TECHNICAL FIELD

The teachings of the present disclosure relate generally to system-on-chip (SoC) integrated circuit design, and in certain aspects, to a pre-boot environment for a SoC.

INTRODUCTION

Computing devices are ubiquitous. Some computing devices are portable, such as mobile phones, tablets, and laptop computers. As the functionality of such portable computing devices increases, the computing or processing power required and, generally, the data storage capacity to support such functionality also increases. In addition to the primary function of these devices, many include elements that support peripheral functions. For example, a cellular telephone may include the primary function of enabling and supporting cellular telephone calls and the peripheral functions of a still camera, a video camera, global positioning system (GPS) navigation, web browsing, sending and receiving emails, sending and receiving text messages, push-to-talk capabilities, etc. Many of these portable devices include a system-on-chip (SoC) to enable one or more primary and peripheral functions on the specific device.

A SoC generally includes multiple central processing unit (CPU) cores embedded in an integrated circuit or chip and coupled to a local bus. The CPU cores may further be arranged into or more computing clusters. The SoC may further generally include hardware components and other processors. For example, a SoC may include one or more CPUs, CPUs with multiple cores, one or more digital signal processors, etc. grouped into one or more subsystems.

The SoC, like larger computing devices such as desktop and server computers, relies on a boot sequence or a boot code upon powering up. The boot sequence is the initial set of operations that the SoC performs when power is first applied to the SoC. The boot code enables a (e.g., bootstrapping) process that initializes and boots the SoC (e.g., to run an operating system (OS)). The boot code is typically stored in a read-only memory (ROM) for quick access, low complexity, spatial efficiency, low cost, and security reasons.

The boot sequence may utilize internal memory (e.g., on-chip memory that is on the same chip as the SoC, such as static random-access memory (SRAM)) and complex drivers to securely boot the SoC, as well as external memory (e.g., off-chip memory that is off the same chip as the SoC, including dynamic random access memory (DRAM), such as double data rate (DDR) synchronous DRAM (SDRAM), low power DDR (LPDDR), etc.) such as to save costs on the amount of internal memory used when the SoC has more functionality that requires more memory to boot. The external memory may be stacked with the SoC (e.g., application processor, modem chip, etc.), may be configured as a package on package design, may be completely external (e.g., not on the same package as the SoC), etc.

As part of the boot sequence, to boot each of or group of the hardware components and other processors of the SoC, there may be a chain of bootloaders and handoff secure executables (e.g., firmware executables, etc., also referred to as firmware images). In particular, each of the hardware components and other processors of the SoC may need to be booted (e.g., securely booted) using a firmware image for the particular hardware component. A chain loading method may be used to boot the various hardware components of the SoC by executing each of the firmware images. The greater the number of hardware components on the SoC, the greater the number of firmware images for the SoC that need to be executed. Accordingly, the boot time of the SoC (e.g., for secure and non-secure boot of components) is a function of the number of firmware images.

In addition, the boot of one or more of the hardware components may be secured, such as to meet requirements in certain applications for strong integrity check, authentication, or other security algorithms, to ensure that the firmware images have not been tampered with or corrupted, and originate from the intended party. Accordingly, the SoC may implement hashing algorithms (e.g., SHA256, SHA384, SHA512, etc.), encryption algorithms (e.g., AES variants), and/or digital signature algorithms (e.g., RSA 2K, RSA 4K, ECC P384, etc.) for checking the integrity and authentication of the firmware images. Further, even when secure boot is not enabled, hashing algorithms may still be used to enforce integrity check of firmware images, such as when booting from flash media or a flashless interface or interconnect (e.g., USB, PCIe, etc.). These various algorithms may be implemented in hardware or in software on the SoC, and due to computational complexity, may result in increased boot time of the SoC. The greater the number of firmware images, the more times such algorithms are run on the firmware images, thus increasing boot time.

In certain scenarios, a SoC may have certain boot time key performance indicator (KPI) metrics to meet. For example, certain components of the SoC may need to boot within certain time periods (e.g., ~500 ms) to meet the KPI (e.g., power on to first sign of life, power on to splash screen on display, power on to OS home screen, power on to when modem or WiFi or other subsystem is booted and ready to connect to a network, power on to car rear camera up, secure boot counterparts, etc.). As the number of components on the SoC grows, meeting the KPI may become difficult. Accordingly, there is a need to reduce SoC boot time.

Unified Extensible Firmware Interface (UEFI) is a specification that defines a software interface between an OS and the hardware platform (e.g., SoC) that the OS executes on. For example, UEFI differentiates between a pre-boot environment (e.g., before an OS is executing on the SoC) and a post-boot environment where the OS is executing on the SoC. This allows an OS to be designed in a hardware agnostic manner, as the software interface creates the interface between the OS and the SoC. The UEFI specification, along with a platform initialization (PI) specification define a pre boot environment (e.g., before the boot process is complete and the OS fully running) including the chain of boot phases for a SoC (e.g., a Security (SEC) phase, a Pre-EFI Initialization phase (PEI), a Driver eXecution Environment (DXE) Phase, a Boot Device Selection (BDS) Phase, an OS Loader phase, etc.). The pre-boot environment may be implemented by loading and executing at the SoC a firmware image that enables the pre-boot environment. The pre-boot environment may provide certain drivers, framework, protocols, and interfaces and also allows certain applications to run on the SoC in the pre-boot environment.

For example, an OS may first execute a boot manager application in the pre-boot environment that loads the OS. Other applications may also be run in the pre-boot environment, such as applications that test and verify functionality of CPU cores, memory, etc.; applications that program (e.g., at the factory) firmware images to the SoC (e.g., via fast-boot); etc.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method of enabling a multicore framework in a pre-boot environment for a system-on-chip (SoC) comprising a plurality of processors comprising a first processor and a second processor. The method includes initiating, by the first processor, bootup of the SoC into a pre-boot environment. The method further includes scheduling, by the first processor, execution of one or more boot-up tasks by a second processor. The method further includes executing, by the second processor, the one or more boot-up tasks in the pre-boot environment. The method further includes executing, by the first processor, one or more additional tasks in parallel with the second processor executing the one or more boot-up tasks.

In some aspects, the present disclosure provides a system-on-chip (SoC) comprising a first processor and a second processor. The first processor is configured to initiate bootup of the SoC into a pre-boot environment. The first processor is configured to schedule execution of one or more boot-up tasks by a second processor. The first processor is configured to execute one or more additional tasks in parallel with the second processor executing the one or more boot-up tasks. The second processor is configured to execute the one or more boot-up tasks in the pre-boot environment.

In some aspects, the present disclosure provides a non-transitory computer readable storage medium that stores instructions that when executed by a system-on-chip (SoC) comprising a plurality of processors comprising a first processor and a second processor, causes the SoC to perform a method of enabling a multicore framework in a pre-boot environment for the SoC. The method includes initiating, by the first processor, bootup of the SoC into a pre-boot environment. The method further includes scheduling, by the first processor, execution of one or more boot-up tasks by a second processor. The method further includes executing, by the second processor, the one or more boot-up tasks in the pre-boot environment. The method further includes executing, by the first processor, one or more additional tasks in parallel with the second processor executing the one or more boot-up tasks.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Although the teachings of this disclosure are illustrated in terms of integrated circuits (e.g., a SoC), the teachings are applicable in other areas. The teachings disclosed should not be construed to be limited to SoC designs or the illustrated embodiments. The illustrated embodiments are merely vehicles to describe and illustrate examples of the inventive teachings disclosed herein. Further, though certain techniques for loading firmware images for boot are described with respect to external memory, similar techniques may be used for loading firmware images for boot from other components such as over high speed devices/interfaces.

Figure 1:
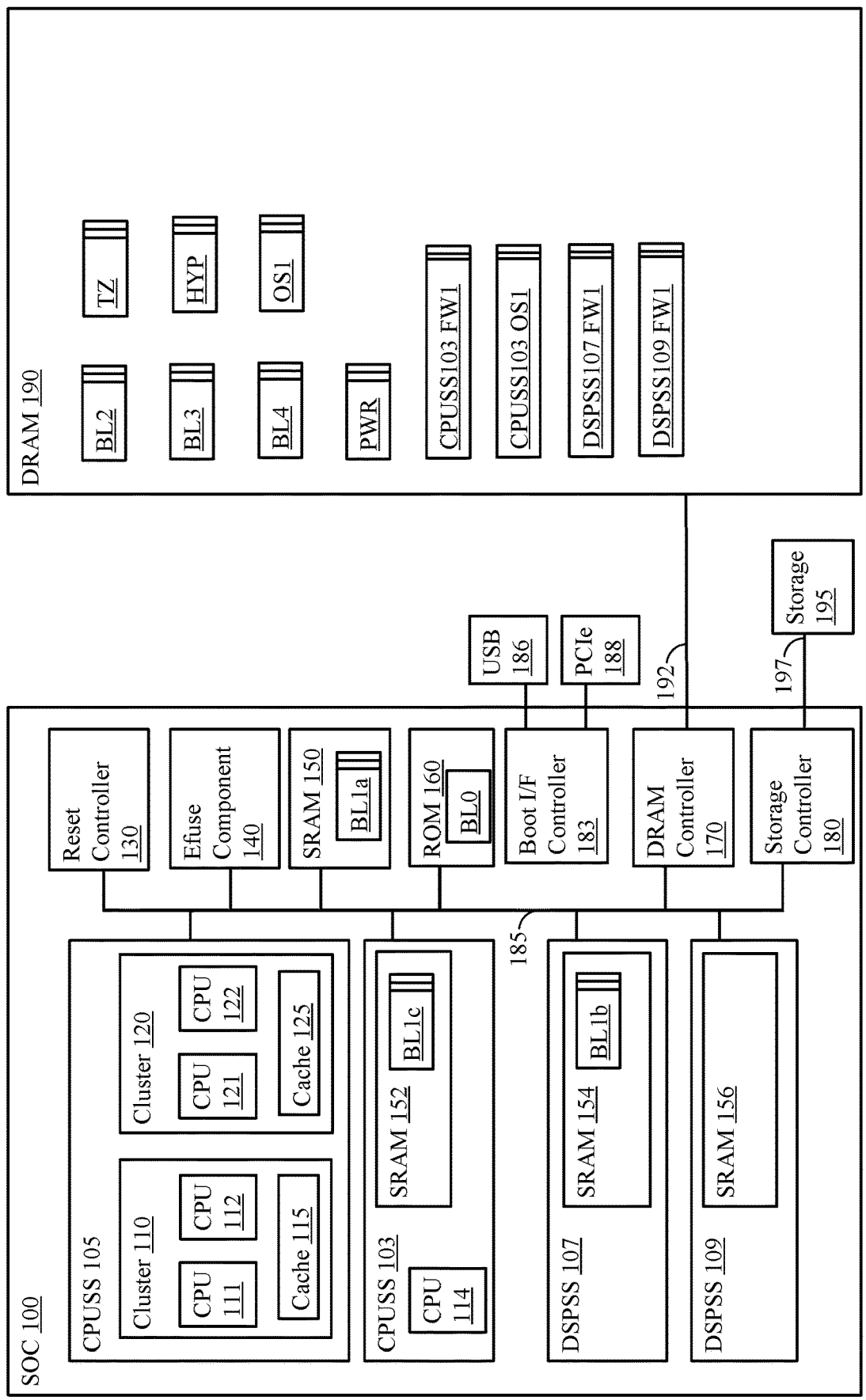
FIG. 1 is a simplified schematic diagram of a system-on-chip (SoC), in accordance with certain aspects of the present disclosure.

FIG. 1 is a simplified schematic diagram of an exemplary SoC 100, in accordance with certain aspects of the present disclosure. The SoC 100 may be interconnected to other chips by one or more chip-to-chip interfaces such as peripheral component interconnect express (PCIe), universal serial bus (USB), serial peripheral interface (SPI), etc. In certain aspects, one of the one or more chip-to-chip interfaces may be used for booting the SoC 100.

As shown, the SoC 100 includes a CPU sub-system (CPUSS) 105. The CPUSS 105 includes a plurality of CPU cores 111, 112, 121, and 122. Though CPUSS 105 is shown with a particular number of CPU cores, it should be noted that there may be additional or fewer cores in CPUSS 105. Further, CPU cores 111 and 112 are part of a cluster 110, and CPU cores 121 and 122 are part of a cluster 120. Again, though shown with a particular number of CPU clusters, CPUSS 105 may include additional or fewer clusters. Further, each cluster may include the same or a different number of CPU cores. The CPU cores 111, 112, 121, and 122 may be of the same type, or may be of different types (e.g., ARM design, non-ARM design, etc.). Further, the CPU cores of a given cluster (e.g., CPU cluster 110 or 120) may be of the same type, or may be of different types (e.g., in-cluster big.LITTLE design, cluster based big.LITTLE design, etc.). A big.LITTLE design may refer to a computing architecture that includes low power, slower processor cores (e.g., LITTLE) that provide battery-savings along with high power, faster processor cores (e.g., big) that provide better processing performance.

Further, the CPUSS 105 may include CPU resources, such as one or more caches. As shown, each cluster 110 and 120 includes a cache 115 and 125, respectively. In certain aspects, the CPU cores of the clusters 110 and 120 may share the cache 115 and 125, respectively, for memory storage. It should be noted that the CPUSS 105 may include additional or different CPU resources than those shown. For example, in some aspects, one or more CPU cores may have its own associated cache, one or more clusters may have its own associated cache (e.g., shared by CPU cores of the cluster), and/or the CPUSS 105 may include one or more caches shared by one or more clusters and/or CPU cores. The SoC 100 further may include additional CPUSS 103, and one or more digital signal processor subsystems (DSPSS) such as DSPSS 107 and DSPSS 109. In certain aspects, each of CPUSS 103, DSPSS 107, and DSPSS 109 may have its own SRAM 152, 154, and 156, respectively, functioning as (e.g., in lieu of) a cache for reading and writing data. CPUSS 103 is shown as having a single CPU core 114, but may include additional cores, caches, etc.

The SoC 100 further includes a reset controller 130, an efuse component 140, static random-access memory (SRAM) 150, a read only memory (ROM) 160, a dynamic RAM (DRAM) controller 170, a storage controller 180, and boot interface (I/F) controller 183, which are all shown as internal (e.g., on-chip) components of the SoC 100. The internal components of the SoC 100 are coupled together by a bus 185. Further, the DRAM controller 170 is coupled to a DRAM 190, which is external (e.g., off-chip) to the SoC 100, by a bus 192. A physical implementation of the DRAM 190 may be stacked with the SoC 100, may be configured as a package on package design, may be completely external (e.g., not part of the same package as the SoC 100), etc. The storage controller 180 is coupled to a storage 195 (e.g., flash storage) external (e.g., off-chip) to the SoC 100 by a bus 197. The SRAM 150, DRAM 190, and storage 195 may provide storage capacity for the SoC 100 in addition to caches 115 and 125.

In some aspects, the reset controller 130, during system boot, is configured to release a CPU core of the CPUSS 105 from reset. In some aspects, the CPU core released is then configured to begin executing code/data (e.g., boot code), such as ROM bootloader BL0 as shown, from the ROM 160 to begin booting the SoC 100. The ROM 160 (e.g., boot ROM) is an integrated circuit that includes the code or codes (e.g., boot code) that are executed by the CPUSS 105 during an initial power-on or upon a watchdog reset condition (e.g., after a malfunction of SoC 100 that is detected by a timer on SoC 100 not being reset or "timing out"). In some aspects, the ROM is enabled in firmware. In some aspects, the CPUSS 105 boots (e.g., securely) from storage 195, by running executables, data images, etc. stored in storage 195 for booting the SoC 100, including the various hardware components of the SoC 100. For example CPUSS 105 loads the firmware images into DRAM 190 from storage 195 for execution. In some aspects, the CPUSS 105 boots (e.g., securely) from a transport layer instead of a storage (e.g., a flashless transport layer). For example, the CPUSS 105 may boot from the transport layer, by loading firmware images booting the SoC 100 received over the transport layer into DRAM 190 for execution. In particular, SoC 100 may utilize boot I/F controller 183 to communicate with another component (e.g., another SoC) over a chip-to-chip interface. For example, boot I/F controller 183 of SoC 100 may control a chip-to-chip interface (e.g., transport layer) of SoC 100 such as PCIe 188 or USB 186 to communicate with a chip-to-chip interface of another component. Accordingly, SoC 100 may communicate over a transport layer via boot I/F controller 183.

In certain aspects, CPUSS 105 boots securely by checking the integrity of firmware images used for boot prior to execution of the firmware images (e.g., using a cryptographic signature protocol, chain of trust, authentication tags, checksums, etc.).

In certain aspects, the CPUSS 105 is configured to boot by running firmware images shown as loaded in DRAM 190, SRAM 150, SRAM 152, SRAM 154, and SRAM 156. For example, the CPUSS 105 executes ROM bootloader BL0 from ROM 160. The ROM bootloader BL0 causes the CPUSS 105 to execute bootloader BL1a in SRAM 150. Bootloader BL1a may initialize DRAM controller 170 and DRAM 190. In certain aspects (e.g., in a boot configuration from flash storage), bootloader BL1a also initializes storage controller 180 and storage 195, and causes CPUSS 105 to load the firmware images into DRAM 190 from storage 195 for execution. In certain aspects (e.g., in a flashless boot configuration), instead of initializing storage controller 180 and storage 195, bootloader BL1a also initializes boot I/F controller 183, and causes CPUSS 105 to load the firmware received over the transport layer into DRAM 190 for execution. Accordingly, the SoC 100 can access firmware images from DRAM 190. BL1a may further boot the SoC 100 by controlling execution of additional firmware images, such as bootloaders BL2, BL3, and BL4, TZ (e.g., secure world firmware), HYP (e.g., hypervisor firmware), and OS1 (e.g., operating system) on the application processor (e.g., CPUSS 105) subsystem. Further, in certain aspects, other subsystem firmware images booted the boot process include PWR (e.g., power firmware), CPUSS103 FW1 (e.g., CPUSS 103 firmware), CPUSS103 OS1 (e.g., CPUSS 103 operating system), DSPSS107 FW1 (e.g., DSPSS 107 firmware), and DSPSS109 FW1 (e.g., DSPSS 109 firmware). In certain aspects, BL1a may further boot the SoC 100 by controlling execution of additional firmware images by other subsystems, such as BL1b by DSPSS 107 and BL1c by CPUSS 103. In certain aspects, certain early firmware images are booted by BL1a, and the remaining firmware images are booted by an operating system such as OS1.

Conventionally, the execution of BL0, BL1a, BL2, BL3, and BL4 is performed on a single core (e.g., CPU core 111) of CPUSS 105, and an operating system, such as the kernel of OS1, is the first firmware image executed on the SoC 100 that enables a scheduler to enable multi core optimizations to allow multiple CPU cores of CPUSS 105 to execute additional firmware images during boot. For example, BL2 and BL3 may implement and enable a pre-boot environment (e.g., as defined by the UEFI specification), and BL4 may be a boot manager that loads the OS.

Figure 1A:
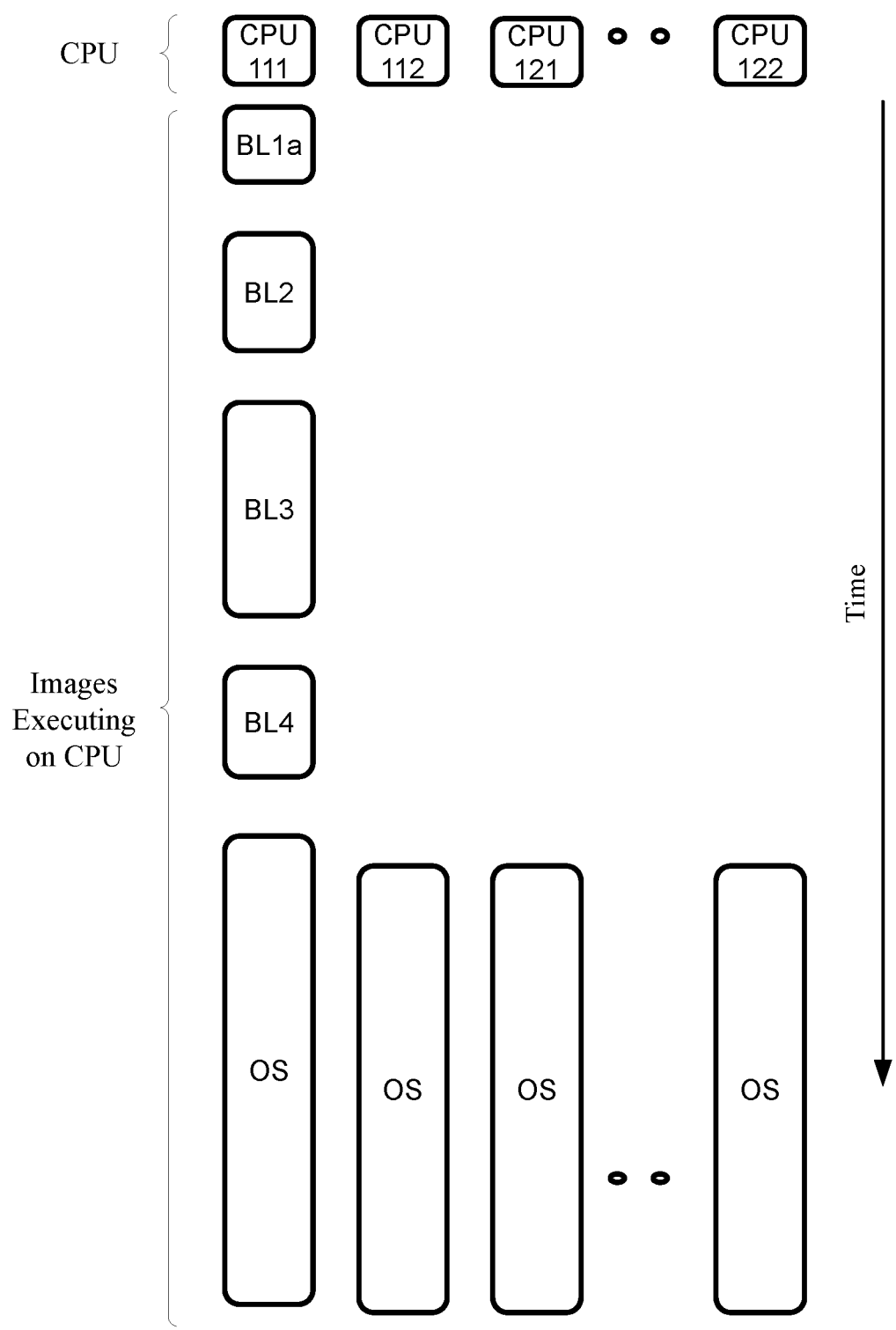
FIG. 1A is a block diagram illustrating an example conventional bootup of a SoC where only a single core is enabled in a pre-boot environment.

FIG. 1A is a block diagram illustrating an example conventional bootup of SoC 100 where only a single core is enabled in the pre-boot environment. In FIG. 1A, CPU core 111 (e.g., as initialized by BL0) executes BL1a. CPU core 111 further executes BL2, BL3, and BL4. As shown, only once an OS begins executing can the OS schedule execution of code (e.g., firmware images) on other cores such as CPU cores 112, 121, and 122.

It should be noted that in certain aspects, there may be more or fewer bootloaders. Further, it should be noted that more or fewer of the bootloaders may map to boot stages that implement and enable a pre-boot environment (e.g., as defined by the UEFI specification). For example, all of BL0, BL1a, BL2, BL3, and BL4 may implement and enable a pre-boot environment.

In particular, the UEFI specification, and most conventional bootloaders or pre-boot environments such as Uboot, coreboot, etc., use a single CPU core of a SoC. For example, applications run in the pre-boot environment use a single CPU core of the SoC, and boot of the SoC may only occur using a single CPU core of the SoC.

The use of multiple CPU cores conventionally only occurs with execution of the kernel of the operating system. In particular, the kernel includes a complex full scheduler for utilizing multiple CPU cores.

Accordingly, certain aspects herein relate to enabling the use of multiple CPU cores of a SoC in a pre-boot environment, without requiring a kernel (e.g., of an OS or bootloader) with a full scheduler be running on the SoC. Advantageously, this may reduce boot time for booting the SoC. For example, in certain aspects, the use of multiple CPU cores may be enabled at the loading of the BL3 firmware image. The multiple CPU cores may be CPU cores of a single CPUSS and/or CPU cores of multiple CPUSSs.

In certain aspects, one CPU core of the SoC 100 may be used as the primary core to boot the SoC 100. For example, CPU core 111 may be used as the primary core and referred to as a boot strap processor (BSP) 111. BSP 111 may, for example, load and run firmware images BL0, BL1a, and BL2 itself. Further, BSP 111 may have the core pre-boot environment stack (e.g., UEFI stack) available to and executable on the BSP 111. For example, services such as regular and uncached memory allocation, serial input/output (I/O), etc. may be implemented as part of the pre-boot environment stack and available to and executable on the BSP 111.

Further, one or more additional cores of the SoC 100 may be used as secondary cores to run processes in the pre-boot environment. For example, CPU cores 112, 121, and 122 may be used as secondary cores and referred to as auxiliary processors (APs) 112, 121, and 122. BSP 111 and APs 112, 121, and 122 as multiple CPU cores may, using techniques discussed herein, perform the processes for loading and running firmware image BL3. APs 112, 121, and 122 may not have the core pre-boot environment stack available to them locally, and therefore services provided as part of the core pre-boot environment stack may not be executable by APs 112, 121, and 122. However, APs 112, 121, and 122 may be used for performing functions that do not require the core pre-boot environment stack locally at each CPU core. It should be noted that though certain aspects are described herein as enabling multiple cores of a single CPUSS in a pre-boot environment, similar techniques may be used to enable multiple cores across multiple CPUSS in a pre-boot environment.

Since APs do not have the core pre-boot environment stack available to them, in order to perform services provided as part of the core pre-boot environment stack, certain aspects herein relate to techniques and mechanisms for allowing APs to utilize the BSP to perform services provided as part of the core pre-boot environment stack. This advantageously allows multiple CPU cores including the BSP and APs to be used in the pre-boot environment.

In certain aspects, each AP 112, 121, and 122 is configured to run code to setup the AP to request services from the BSP 111, where the code may be referred to as an auxiliary kernel (AK). Additionally, the AK may set up the stack, memory management unit (MMU), caches, translation lookaside buffer (TLB), timers, etc. for each of the APs 112, 121, and 122. Further, the AK may run an idle task on the APs 112, 121, and 122 when they are not running other code. The idle task may be code that keeps the APs in a low power state such as a wait for interrupt (WFI) state, where the APs wait for an interrupt from BSP 111 to perform a task or execute an application.

Figure 1B:
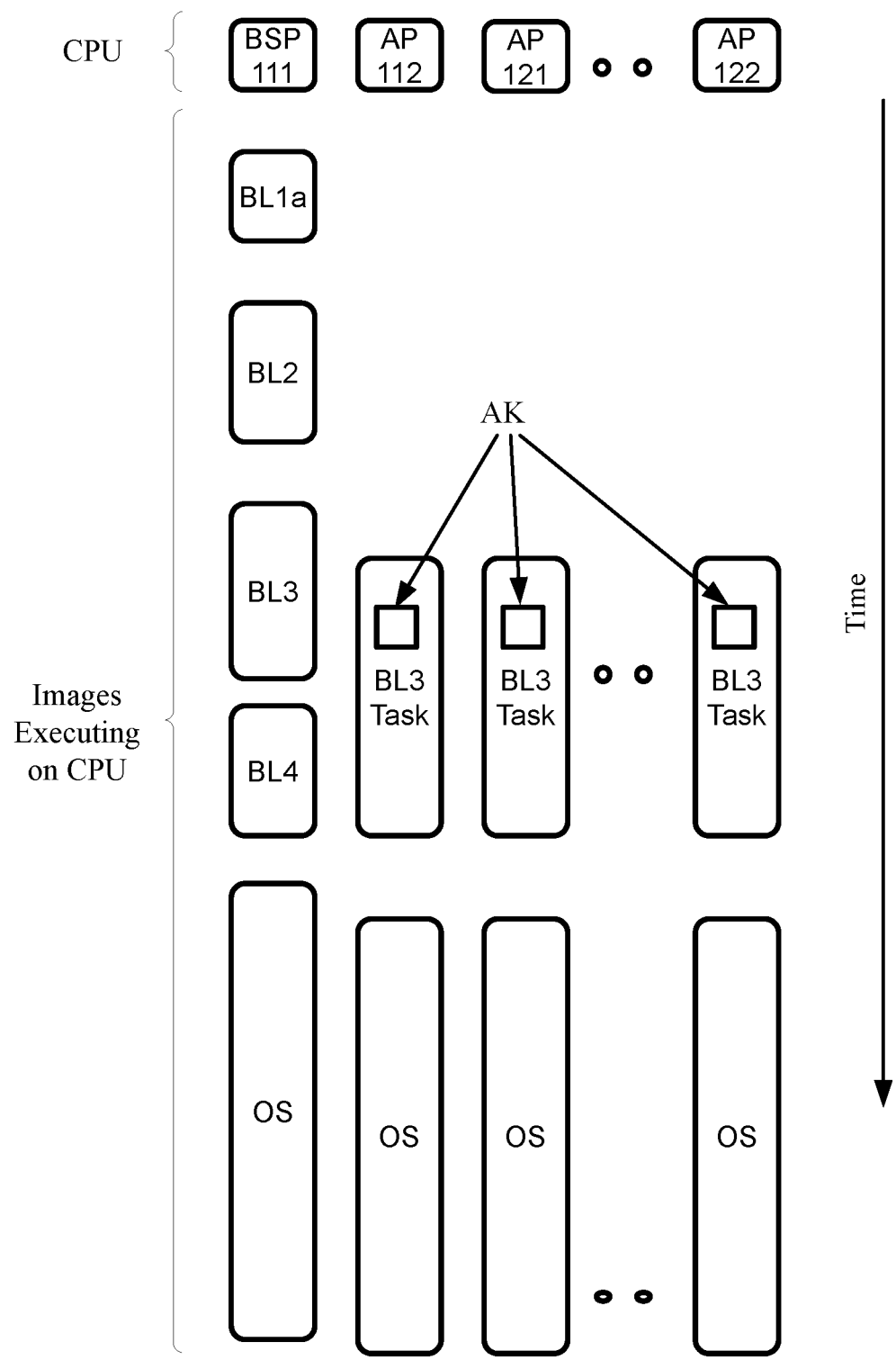
FIG. 1B is a block diagram illustrating an example bootup of a SoC where multiple cores are enabled in a pre-boot environment, in accordance with certain aspects of the present disclosure.

FIG. 1B is a block diagram illustrating an example bootup of SoC 100 where multiple cores are enabled in a pre-boot environment, in accordance with certain aspects of the present disclosure. The techniques for bootup described herein where multiple cores are enabled in a pre-boot environment may be used to bootup the same types of SoC as the conventional techniques described with respect to FIG. 1A, but enable multiple cores instead of only a single core in the pre-boot environment. In FIG. 1B, BSP 111 (e.g., as initialized by BL0) executes BL1a. CPU BSP 111 further executes BL2, BL3, and BL4. However, unlike FIG. 1A, each of APs 112, 121, and 122 can begin executing code (e.g., tasks of firmware images) once BL3 is executed and before execution of the OS. In particular, as part of execution of BL3, each of APs 112, 121, and 122 executes AK, which as will be discussed further enables the APs to request services from the BSP 111.

The BSP 111 and APs 112, 121, and 122 may all be able to access a shared memory (e.g., referred to as a mailbox) for inter-processor communication (IPC) between the BSP 111 and APs 112, 121, and 122. The shared memory may be any suitable memory (e.g., uncached memory) accessible by the processors, such as on one or more of SRAM 150, DRAM 190, etc. For example, APs 112, 121, and 122 may utilize the mailbox to request services be performed by the BSP 111, and the BSP 111 may utilize the mailbox to return the results of the services to APs 112, 121, and 122. In certain aspects, the AK running on an AP, upon initial run or after receiving a software generated interrupt (SGI) when in a WFI state, is configured to cause the AP to check the mailbox to determine the next task to execute on the AP. If no task is scheduled in the mailbox for the AP, then the AP returns to running the idle task. In certain aspects, the AK may disable fast interrupt request (FIQ) and interrupt request (IRQ) at the AP to enable SGI.

In certain aspects, the mailbox includes a set of flags (e.g., message (MSG) flag and acknowledgement (ACK) flag) and corresponding message buffer for each AP. For example, BSP 111 and AP 112 may utilize a MSG flag, ACK flag, and message buffer for IPC. Each of the MSG flag and ACK flag may be owned by only one entity (e.g., BSP or AP) at a time, meaning that only the owning entity has rights to change or write to the flag value (though any other entity may be able to read the flag value). For communications initiated by an AP to the BSP 111, the AP owns the MSG flag and the BSP 111 owns the ACK flag. For communications initiated by the BSP 111 to an AP, the BSP 111 owns the MSG flag and the AP owns the ACK flag. In certain aspects, when both the MSG flag and the ACK flag are set to an OFF value (e.g., 0), there are no messages in the corresponding message buffer. In certain aspects, when the MSG flag is set to an ON value (e.g., 1), and the ACK flag is set to OFF, a message has been placed in the corresponding message buffer by a source entity to a destination entity. In certain aspects, when the MSG flag is ON and the ACK flag is ON, the message has been acknowledged by the destination entity. In certain aspects, when the MSG flag is OFF and the ACK flag is ON, the source entity has received the acknowledgement from the destination entity.

In certain aspects, techniques for scheduling are provided for assigning tasks from BSP 111 to APs 112, 121, and 122. For example, the core pre-boot environment stack may have protocols enabled that allow modules (e.g., applications, drivers, libraries, etc. running on BSP 111) to request services be performed using the core pre-boot environment stack. In certain aspects, a multicore scheduling protocol (e.g., referred to as EFI_MP_SCHED_PROTOCOL) is provided in the pre-boot environment. The multicore scheduling protocol may be configured to take as input an identifier (e.g., number) of a CPU core and code (e.g., a function) to be executed by the CPU core and then cause the CPU core to execute the code. In certain aspects, instead of the multicore scheduling protocol receiving an input identifying a specific CPU core to run the code, the multicore scheduling protocol may select a CPU core to run the code (e.g., utilizing a load balancing algorithm). For example, the multicore scheduling protocol may be executed on BSP 111 to enable execution of code by APs 112, 121, and 122. When BSP 111 receives a call to the multicore scheduling protocol to schedule execution of code on a particular AP, the BSP 111 running the multicore scheduling protocol schedules execution of the code on the particular AP. For example, the multicore scheduling protocol keeps track (e.g., in suitable memory on SoC 100 such as SRAM, DRAM, etc.) of a state of each of the APs 112, 121, and 122 including whether the APs are in a powered off state, in a low powered on state (e.g., a WFI state), or in a powered on state running another task.

The multicore scheduling protocol then determines how to schedule execution of code on a particular AP based on the state of the AP. For example, if the AP is in a powered off state, the multicore scheduling protocol powers on the AP. For example, BSP 111 may run firmware images that implement a power state coordination interface (PSCI) that is used to power up and power down CPU cores. In certain aspects, PSCI is implemented according to the PSCI specification as defined by ARM. The BSP 111 further causes the AP to run the AK to setup and manage the AP. The AP then checks the mailbox and runs code scheduled for execution in the mailbox. If the AP is in a low powered on state, the BSP 111 generates a SGI to wake up the AP to check the mailbox and run code scheduled for execution in the mailbox. For example, the AP checks to see if a MSG flag is set in the mailbox, and if so, executes code in the corresponding buffer. If the AP is in a powered on state running another task corresponding to other code, the BSP 111 waits until the task is complete (e.g., the AP enters a lower power state) before scheduling the code for execution.

In certain aspects, the scheduling techniques further provide an entry point library (e.g., referred to as the AKUefiDriverEntryPoint) running on BSP 111 that serves to act as a bridge between the BSP 111 and an AP for setting an entry point (e.g., for transferring control to the code to run on the AP) for code running on the AP. For example, when the AK on an AP needs to run code (e.g., start an application) on the AP, the AK may need to communicate entry point parameters to the code. The entry point library sets up the bridge for the AK, by setting up the mailbox with information (e.g., messages, identifier of an AP, identifier of code, an entry point, etc.) regarding the entry point parameters. The AK can then read the information from the mailbox and an entry point function running on the AP can set the entry point based on the entry point parameters for the code to run on the AP.

In certain aspects, techniques for APs 112, 121, and 122 requesting services be performed by the BSP 111 are provided. For example, in certain aspects, a multicore I/O protocol (e.g., referred to as EFI_MP_IO_PROTOCOL) is provided in the pre-boot environment. The multicore I/O protocol may be configured to register "ports" for accessing the BSP 111 to perform generic I/O between BSP 111 and an AP. For example, there may be a separate port for each AP 112, 121, and 122 to communicate with BSP 111. In certain aspects, each port may be used for communicating information for several different service types (e.g., memory allocation, serial logging (e.g., using a universal asynchronous receiver-transmitter (UART)), etc.) and be registered at both the BSP 111 and the corresponding AP. The BSP 111 and APs may be configured to use message passing interface (MPI) semantics to send/receive message, such as to handle remote procedure call (RPC) requests from the APs. In certain aspects, the multicore I/O protocol is used for registering ports at the BSP 111.

In certain aspects, every time a set of code or a task is run on BSP 111 or APs 112, 121, and 122, they are each passed a system table that allows the BSP 111 or APs 112, 121, and 122 to use services provided by the pre-boot environment stack. The system table may include a boot services table, and a run time services table. The system table may include pointers to memory locations that include code corresponding to the services. When a service is called by code running on a BSP or an AP, the system table may be used to determine where to find the code corresponding to the service for execution.

Figure 2:
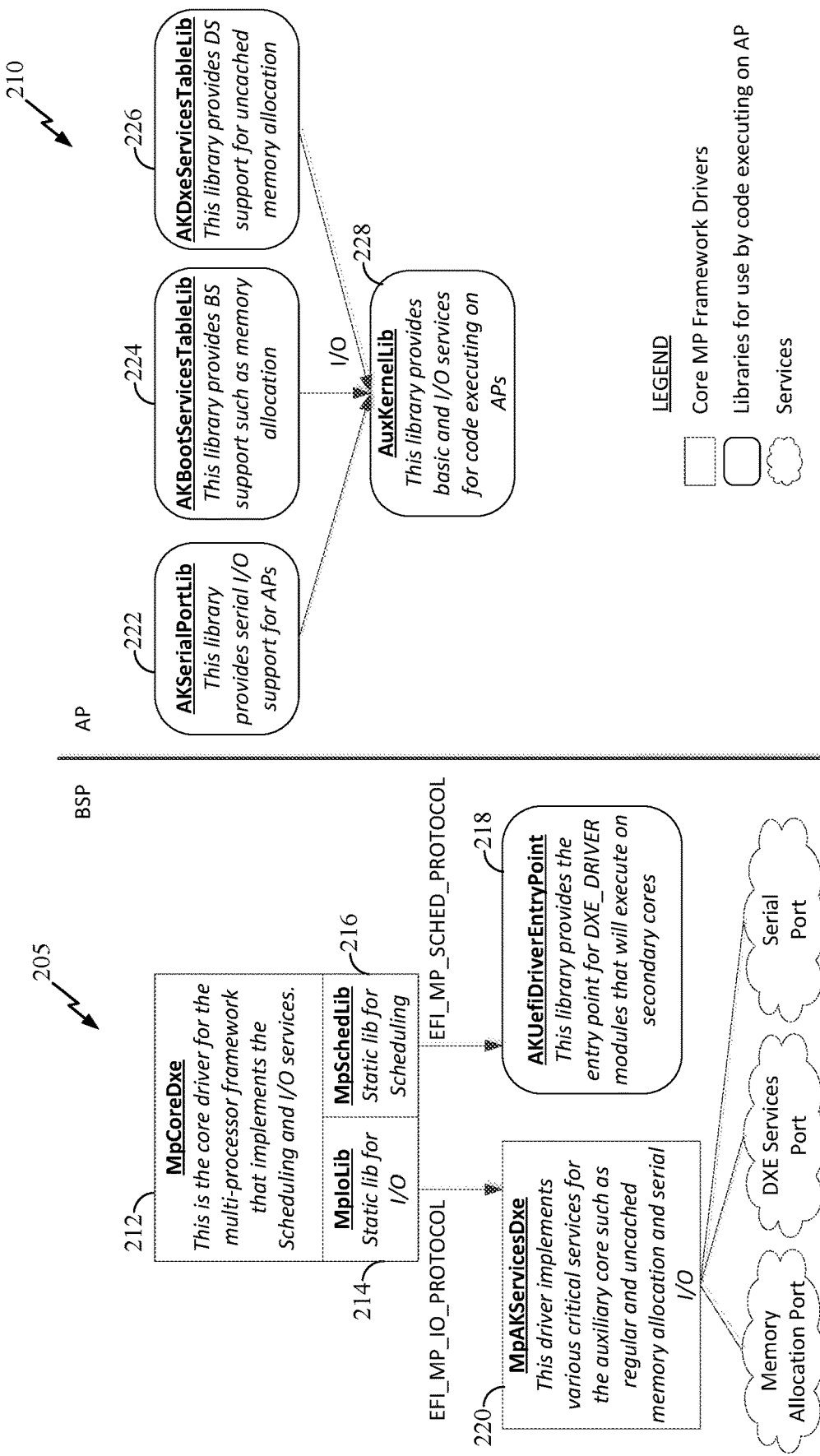
FIG. 2 is a block diagram of a framework for a multicore-capable pre-boot environment, in accordance with certain aspects of the present disclosure.

FIG. 2 is a block diagram of a framework for a multicore-capable pre-boot environment, in accordance with certain aspects of the present disclosure.

As shown, drivers and libraries 205 correspond to core framework drivers and libraries that execute on the BSP 111. Core driver 212 (e.g., referred to as MpCoreDxe), which executes on BSP 111, is the core driver that implements the scheduling and I/O services discussed. The core driver 212 includes an I/O library 214 (e.g., referred to as MpIoLib), which implements the multicore I/O protocol. The I/O library 214 works with a services driver 220 (e.g., referred to as MpAKServicesDxe), which implements some services of the pre-boot environment stack, to provide services to the APs 112, 121, and 122. The I/O library 214, as shown, may register ports as discussed that are serviced by the services driver 220.

The core driver 212 further includes a scheduling library 216 (e.g., referred to as MpSchedLib), which implements the multicore scheduling protocol. The scheduling library works with the entry point library 218 to set an entry point for code running on an AP.

Further, libraries 210 correspond to libraries executing on APs 112, 121, and 122. Serial port library 222 (e.g., referred to as AKSerialPortLib) is a library that provides serial I/O support for APs. Boot services table library 224 (e.g., referred to as AKBootServicesTableLib) is a library that provides boot services support such as memory allocation. DXE services table library 226 (e.g., referred to as AKDXEServicesTableLib) is a library that provides DXE services support such as uncached memory allocation. Each of serial port library 222, boot services table library 224, and DXE services table library 226 communicates with an AP I/O entity 228(e.g., referred to as an AuxKernelLib), which communicates with the I/O library 214 to perform I/O over ports between BSP 111 and APs 112, 121, and 122. In certain aspects, the AP I/O entity 228 at each AP 112, 121, and 122 registers ports at the AP 112, 121, and 122, respectively. The AP I/O entity 228 at each AP 112, 121, and 122 may also provide generic application programming interfaces (APIs) for the AP 112, 121, and 122, respectively, to communicate with the BSP 111.

Figure 3:
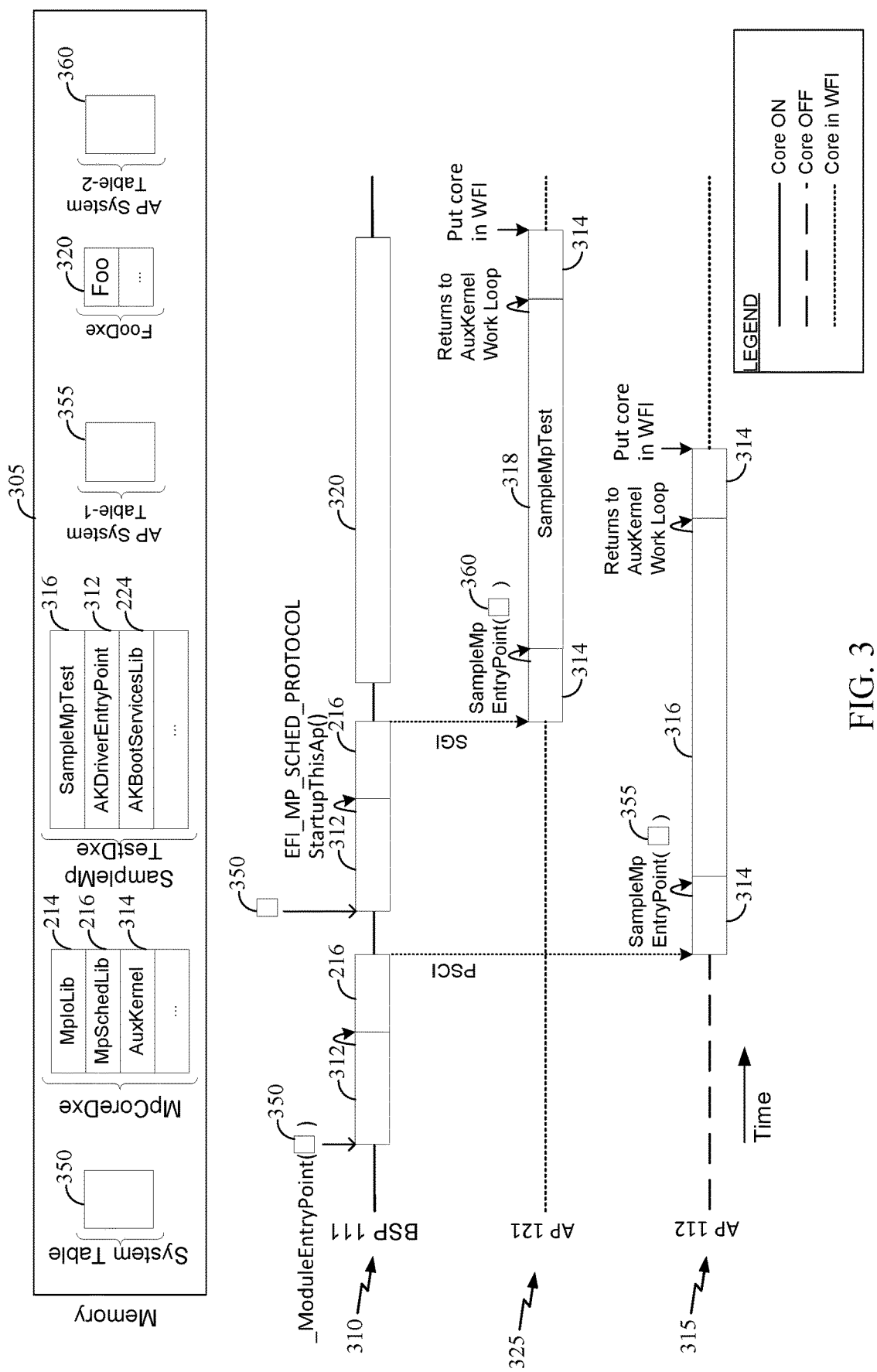
FIG. 3 illustrates execution of code over time on a boot strap processor (BSP) and auxiliary processors (APs), in accordance with certain aspects of the present disclosure.

FIG. 3 illustrates execution of code over time on BSP 111 and APs 112 and 121, in accordance with certain aspects of the present disclosure. As shown, memory 305 illustrates the state of memory (e.g., DRAM 190) when executing the code on BSP 111 and APs 112 and 121.

Line 310 illustrates execution of code at BSP 111. In order to execute code (e.g., an application shown as SampleMpTest), an entry point entity 312 receives a system table 350 (e.g., a UEFI system table) that points to actual code for services that execute on the BSP 111. The entry point 312 may be referred to as AKDriverEntryPoint, which may correspond to entry point library 218. The entry point entity 312 then calls into the scheduling library 216 to request that the code be executed on AP 112. In the example shown, scheduling library 216 determines AP 112 is in a powered off state and accordingly utilizes a PSCI call to power on or turn on AP 112 and cause AP 112 to run AK 314.

Line 315 illustrates execution of code at AP 112. AP 112 executes AK 314 (e.g., which may correspond to AP I/O entity 228). Further, AK 314 passes a system table 355 to SampleMpTest 316 to execute SampleMpTest 316 on AP 112. System table 355 differs from system table 350, in that it does not directly point to services of the core pre-boot environment stack to run on AP 112, but rather includes pointers to functions that call back to the BSP 111 to execute services of the core pre-boot environment stack. Therefore, any calls to services made by SampleMpTest 316 call back to BSP 111 for execution. SampleMpTest 316 is then executed on AP 112. When SampleMpTest 316 is done running, the AP 112 returns to executing AK 314, which may run an idle task and put AP 112 in a low power state.

Since BSP 111 calls for execution of SampleMpTest 316 on AP 112 instead of on BSP 111, BSP 111 can call for execution of another program, SampleMpTest 318 (e.g., the same or a different program than SampleMpTest 316) on AP 121 and/or BSP 111 in parallel with the execution of SampleMpTest 316 on AP 112. For example, entry point entity 312 executes on BSP 111 and receives system table 350. The entry point entity 312 then calls into the scheduling library 216 to request that the code be executed on AP 121. In the example shown, scheduling library 216 determines AP 121 is in a low power state and accordingly utilizes a SGI to wake up AP 121.

Line 325 illustrates execution of code at AP 121. AK 314 executing on AP 121 passes a system table 360 to SampleMpTest 318 to execute SampleMpTest 318 on AP 121. System table 360 differs from system table 350, in that it does not directly point to services of the core pre-boot environment stack to run on AP 121, but rather includes pointers to functions that call back to the BSP 111 to execute services of the core pre-boot environment stack. Therefore, any calls to services made by SampleMpTest 318 call back to BSP 111 for execution. SampleMpTest 318 is then executed on AP 121. When SampleMpTest 318 is done running, the AP 121 returns to executing AK 314, which may run an idle task and put AP 121 in a low power state.

In certain aspects, while SampleMpTest 316 and SampleMpTest 318 are running on AP 112 and AP 121, respectively, BSP 111 is free to execute other code (e.g., shown as Foo 320).

Figure 4:
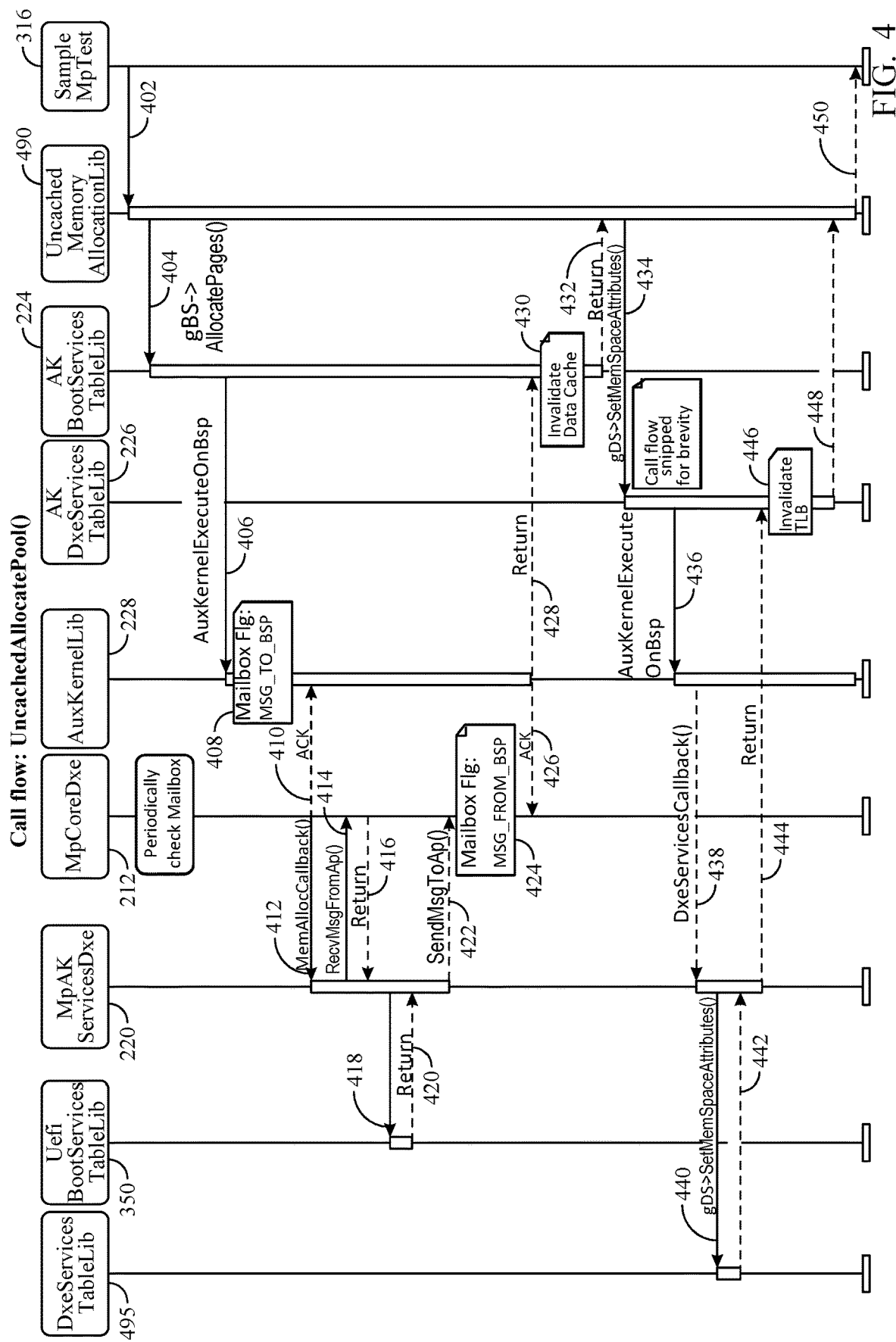
FIG. 4 is a signal flow diagram for how an application executing on an AP requests a service from a BSP, in accordance with certain aspects of the present disclosure.

FIG. 4 is a signal flow diagram for how an application executing on an AP requests a service from a BSP, in accordance with certain aspects of the present disclosure.

As shown, SampleMpTest 316 may be running on AP 112. At step 402, SampleMpTest 316 requests uncached memory, which may be a service provided by the core pre-boot environment stack, from an uncached memory allocation library 490. At step 404, the uncached memory allocation library 490 calls into the boot services table library 224. Boot services table library 224 accesses system table 355 to request a service to allocate memory (not shown). At step 406, boot services table library 224 calls into AP I/O entity 228 running on AP 112 to request BSP 111 to allocate memory. At step 408, the AP I/O entity 228 is configured to set information in the mailbox for the BSP 111. For example, the AP I/O entity 228 sets a MSG flag corresponding to communication from AP 112 to BSP 111 to ON, and includes in a corresponding message buffer a message requesting allocation of memory.

Core driver 212 running on BSP 111 is configured to check (e.g., periodically) the mailbox to determine if there are any messages for the BSP 111 from an AP. Accordingly, the core driver 212 determines the MSG flag corresponding to AP 112 is set to ON and therefore there is a message in the corresponding message buffer. At step 410, the core driver 212 sets an ACK flag corresponding to AP 112 to ON acknowledging the message. The AP I/O entity 228 then sets the MSG flag corresponding to AP 112 to OFF and the core driver 212 sets the ACK flag corresponding to AP 112 to OFF (not shown).

The core driver 212 then reads the message in the message buffer and determines that the message is requesting allocation of memory. For example, the core driver 212 determines that the request for allocation of memory is a memory port request. At step 412, the core driver 212 calls services driver 220 to service the request to allocate memory. The services driver 220 implements ports including a port to allocate memory. The services driver 220, at step 414, sends a request to core driver 212 for the memory allocation message from the AP 112 in the message buffer, which may include a size of the memory allocation. At step 416, the core driver 212 returns the memory allocation message to the services driver 220. At step 418, the services driver 220 then calls to a services library (e.g., referred to as UEFIBootServicesTableLib), which accesses system table 350 (e.g., using the same call made at step 404) to request a service to allocate memory. The service library accessing system table 350 allocates the memory, and at step 420, returns a pointer to the allocated memory to services driver 220. At step 422, the services driver 220 then calls core driver 212 to respond to the service request received from the AP 112.

Accordingly, at step 424, the core driver 212 is configured to set information in the mailbox for the AP 112. For example, the core driver 212 sets a MSG flag corresponding to communication from BSP 111 to AP 112 to ON, and includes in a corresponding message buffer a message including a pointer to the allocated memory.

The AP I/O entity 228 determines the MSG flag corresponding to AP 112 is set to ON and therefore there is a message in the corresponding message buffer. At step 426, the AP I/O entity 228 sets an ACK flag corresponding to AP 112 to ON acknowledging the message. The core driver 212 then sets the MSG flag corresponding to AP 112 to OFF and the AP I/O entity 228 sets the ACK flag corresponding to AP 112 to OFF (not shown).

At step 428, the AP I/O entity 228 returns the pointer to the allocated memory to boot services table library 224. At step 430, the boot services table library 224 invalidates the cache for the allocated memory, since the memory allocation request was for uncached memory. At step 432, the boot services table library 224 returns a pointer to the allocated memory to uncached memory allocation library 490. Further, since by default the service library accessing system table 350 allocates cached memory instead of uncached memory, uncached memory allocation library 490 generates a call to change attributes (e.g., invalidate cache, TLB, etc.) of the allocated memory to uncached memory.

At step 434, the uncached memory allocation library 490 calls into DXE services table library 226. The DXE services table library 226 accesses system table 355 to change the attributes of the allocated memory (not shown). At step 436, DXE services table library 226 calls into AP I/O entity 228 running on AP 112 to request BSP 111 to change the attributes of the allocated memory. The AP I/O entity 228 is configured to set information in the mailbox for the BSP 111. For example, the AP I/O entity 228 sets a MSG flag corresponding to communication from AP 112 to BSP 111 to ON, and includes in a corresponding message buffer a message requesting change of the attributes of the allocated memory.

Though not shown, the core driver 212 determines the MSG flag corresponding to AP 112 is set to ON and therefore there is a message in the corresponding message buffer. The core driver 212 sets an ACK flag corresponding to AP 112 to ON acknowledging the message (not shown). The AP I/O entity 228 then sets the MSG flag corresponding to AP 112 to OFF and the core driver 212 sets the ACK flag corresponding to AP 112 to OFF (not shown).

The core driver 212 reads the message in the message buffer and determines that the message is requesting change of the attributes of the allocated memory (not shown). At step 438, the core driver 212 calls services driver 220 to service the request to change the attributes of the allocated memory. At step 440, the services driver 220 then calls to a services library 495 (e.g., referred to as DxeServicesTableLib), which accesses system table 350 (e.g., using the same call made at step 434) to request a change of the attributes of the allocated memory. The services library 495 changes the attributes of the allocated memory, and at step 442, returns a message to services driver 220 that the attributes have been changed.

At step 444, the services driver 220 then returns the call from DXE services table library 226 in a return message indicating the attributes have been changed. For example, though not shown, services driver 220 calls core driver 212 to respond to the service request received from the AP 112. The core driver 212 is configured to set information in the mailbox for the AP 112. For example, the core driver 212 sets a MSG flag corresponding to communication from BSP 111 to AP 112 to ON, and includes in a corresponding message buffer a message including a return message indicating the attributes have been changed (not shown). The AP I/O entity 228 determines the MSG flag corresponding to AP 112 is set to ON and therefore there is a message in the corresponding message buffer (not shown). The AP I/O entity 228 sets an ACK flag corresponding to AP 112 to ON acknowledging the message (not shown). The core driver 212 then sets the MSG flag corresponding to AP 112 to OFF and the AP I/O entity 228 sets the ACK flag corresponding to AP 112 to OFF (not shown). The AP I/O entity 228 returns the call from DXE services table library 226 in a return message indicating the attributes have been changed (not shown).

At step 446, the DXE services table library 226 invalidates the TLB for the allocated memory, since the memory allocation request was for uncached memory. At step 448, the DXE services table library 226 returns a message to uncached memory allocation library 490 indicating the memory attributes have been changed. At step 450, uncached memory allocation library 490 returns a pointer to the allocated uncached memory to SampleMpTest 316.

The use of multiple cores in the pre-boot environment may beneficially reduce boot time, allow multiple cores to be tested in the pre-boot environment, and/or be used to download binaries for faster factory programming of a SoC via fastboot.

Figure 5:
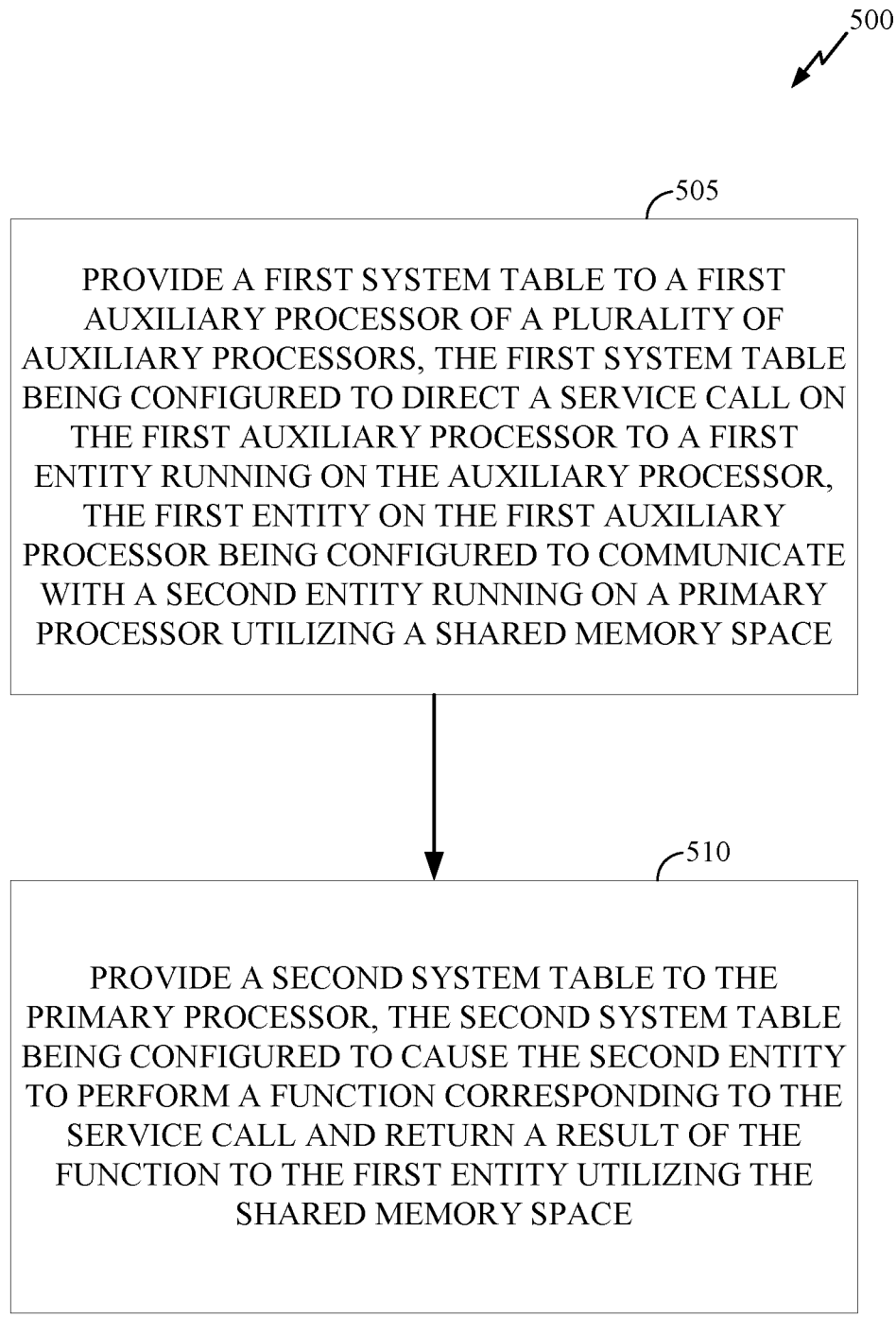
FIG. 5 is a flow chart that illustrates example operations for enabling a multicore framework in a pre-boot environment for a system-on-chip (SoC), in accordance with certain aspects of the present disclosure.

FIG. 5 is a flow chart that illustrates example operations 500 for enabling a multicore framework in a pre-boot environment for a system-on-chip (SoC), in accordance with certain aspects of the present disclosure. For example, the operations of FIG. 5 may be performed by the SoC 100, or another suitable circuit.

At step 505, a first system table is provided to a first auxiliary processor (e.g., AP) of one or more auxiliary processors, the first system table being configured to direct a service call on the first auxiliary processor to a first entity running on the auxiliary processor, the first entity on the first auxiliary processor being configured to communicate with a second entity running on the primary processor (e.g., BSP) (e.g., utilizing a shared memory space).

At step 510, a second system table is provided to the primary processor, the second system table being configured to cause the second entity to perform a function corresponding to the service call and return a result of the function to the first entity (e.g., utilizing the shared memory space).

Figure 6:
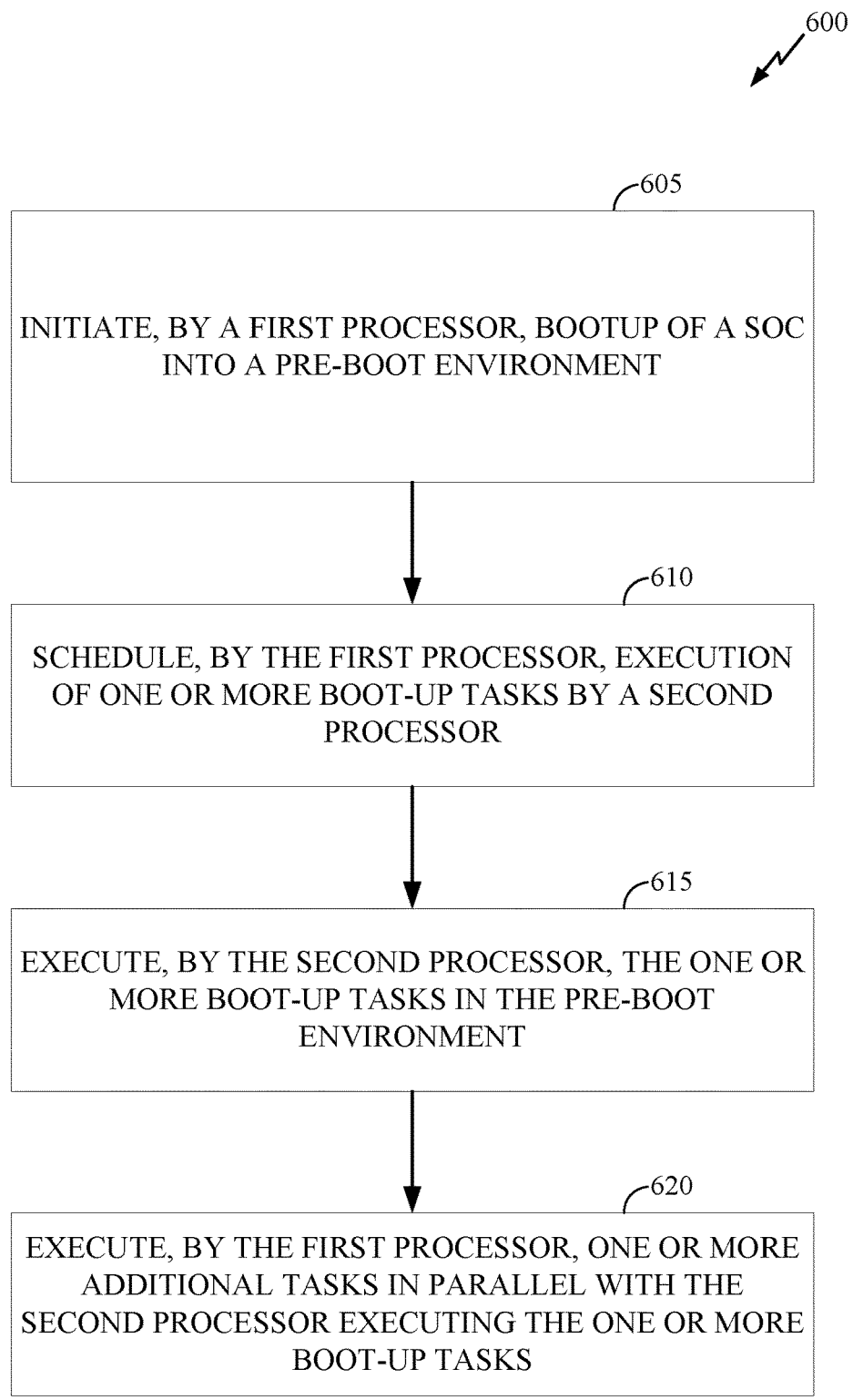
FIG. 6 is a flow chart that illustrates example operations for enabling a multicore framework in a pre-boot environment for a system-on-chip (SoC), in accordance with certain aspects of the present disclosure.

FIG. 6 is a flow chart that illustrates example operations 600 for enabling a multicore framework in a pre-boot environment for a system-on-chip (SoC), in accordance with certain aspects of the present disclosure. For example, the operations of FIG. 6 may be performed by the SoC 100, or another suitable circuit.

At step 605, a first processor of a SoC initiates bootup of the SoC into a pre-boot environment (e.g., wherein in the pre-boot environment an operating system is not executing on the SoC). At step 610, the first processor schedules execution of one or more boot-up tasks by a second processor.

At step 615, the second processor executes the one or more boot-up tasks in the pre-boot environment. At step 620, the first processor executes one or more additional tasks in parallel with the second processor executing the one or more boot-up tasks.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disc storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc. Combinations of the above should also be included within the scope of computer-readable media.

What is claimed is:

1. A method of enabling a multicore framework in a pre-boot environment for a system-on-chip (SoC) comprising a plurality of processors comprising a first processor and a second processor, the method comprising:

initiating, by the first processor, bootup of the SoC into a pre-boot environment;
   determining, by the first processor, a state of the second processor;
   at least one of sending an interrupt to or turning on the second processor based on the state of the second processor;
   scheduling, by the first processor, execution of one or more boot-up tasks by a second processor;
   executing, by the second processor, the one or more boot-up tasks in the pre-boot environment;
   executing, by the first processor, one or more additional tasks in parallel with the second processor executing the one or more boot-up tasks;
   directing, by the second processor to the first processor, a service call related to the one or more boot-up tasks;
   performing, by the first processor, a function corresponding to the service call; and
   returning, by the first processor to the second processor, a result of the function, wherein the directing is performed using a first system table provided to the second processor, the first system table being configured to direct the service call on the second processor to a first entity running on the second processor, the first entity on the second processor being configured to communicate with a second entity running on the first processor, and wherein the performing and returning are performed using a second system table provided to the first processor, the second system table being configured to cause the second entity to perform the function corresponding to the service call and return the result of the function to the first entity.

2. The method of claim 1, wherein in the pre-boot environment an operating system is not executing on the SoC, and further comprising:
   completing executing in the pre-boot environment by loading the operating system; and
   scheduling, by the operating system, execution of code on the first processor and the second processor in parallel.

3. The method of claim 1, wherein the second system table comprises a UEFI system table.

4. The method of claim 1, further comprising:
   receiving, by the second processor, the service call;
   storing in a first buffer a first message corresponding to the service call;
   setting, by the second processor, a first flag associated with the first buffer to indicate to the first processor the first buffer includes the first message;
   determining, by the first processor, the first buffer includes the first message based on the first flag;
   reading, by the first processor, the first message from the first buffer;
   performing, by the first processor, the function corresponding to the service call based on the first message;
   storing, by the first processor, in a second buffer, a second message corresponding to the result of the function;
   setting, by the first processor, a second flag associated with the second buffer to indicate to the second processor the second buffer includes the second message;
   determining, by the second processor, the second buffer includes the second message based on the second flag; and
   reading, by the second processor, the second message from the second buffer.

5. The method of claim 1, wherein the service call comprises at least one of a memory allocation request, a call related to a verification of the second processor, or a call related to programming the SoC.

6. The method of claim 1, wherein the second processor and the first processor are configured to communicate using a shared memory space comprising one or more flags and one or more buffers associated with the one or more flags, wherein the one or more flags are used to synchronize passing of messages between the first and second processors.

7. The method of claim 6, wherein for each flag of the one or more flags, each of the plurality of computing cores is enabled to read the flag, and only one of the plurality of computing cores is enabled to write to the flag.

8. A system-on-chip (SoC) comprising:
   a first processor configured to:
      initiate bootup of the SoC into a pre-boot environment;
      determine a state of the second processor;
      at least one of send an interrupt to or turn on the second processor based on the state of the second processor;
      schedule execution of one or more boot-up tasks by a second processor; and
      execute one or more additional tasks in parallel with the second processor executing the one or more boot-up tasks;
   the second processor configured to:
      execute the one or more boot-up tasks in the pre-boot environment; and
      direct to the first processor a service call related to the one or more boot-up tasks; and
   the first processor is further configured to:
      perform a function corresponding to the service call; and
      return to the second processor a result of the function, wherein the directing is performed using a first system table provided to the second processor, the first system table being configured to direct the service call on the second processor to a first entity running on the second processor, the first entity on the second processor being configured to communicate with a second entity running on the first processor, and wherein the performing and returning are performed using a second system table provided to the first processor, the second system table being configured to cause the second entity to perform the function corresponding to the service call and return the result of the function to the first entity.

9. The SoC of claim 8, wherein in the pre-boot environment an operating system is not executing on the SoC, and wherein the first processor is further configured to:
   complete executing in the pre-boot environment by loading the operating system, and wherein the operating system is configured to schedule execution of code on the first processor and the second processor in parallel.

10. The SoC of claim 8, wherein the second system table comprises a UEFI system table.

11. The SoC of claim 8, wherein:
   the second processor is further configured to:
      receive the service call;
      store in a first buffer a first message corresponding to the service call; and
      set a first flag associated with the first buffer to indicate to the first processor the first buffer includes the first message;
   the first processor is further configured to:

determine the first buffer includes the first message based on the first flag;
read the first message from the first buffer;
perform the function corresponding to the service call based on the first message;
store in a second buffer a second message corresponding to the result of the function; and
set a second flag associated with the second buffer to indicate to the second processor the second buffer includes the second message; and
the second processor is further configured to:
determine the second buffer includes the second message based on the second flag; and
read the second message from the second buffer.

12. The SoC of claim 8, wherein the service call comprises at least one of a memory allocation request, a call related to a verification of the second processor, or a call related to programming the SoC.

13. The SoC of claim 8, wherein the second processor and the first processor are configured to communicate using a shared memory space comprising one or more flags and one or more buffers associated with the one or more flags, wherein the one or more flags are used to synchronize passing of messages between the first and second processors.

14. The SoC of claim 13, wherein for each flag of the one or more flags, each of the plurality of computing cores is enabled to read the flag, and only one of the plurality of computing cores is enabled to write to the flag.

15. A non-transitory computer readable storage medium that stores instructions that when executed by a system-on-chip (SoC) comprising a plurality of processors comprising a first processor and a second processor, causes the SoC to perform a method of enabling a multicore framework in a pre-boot environment for the SoC, the method comprising:
initiating, by the first processor, bootup of the SoC into a pre-boot environment;
determining, by the first processor, a state of the second processor;
at least one of sending an interrupt to or turning on the second processor based on the state of the second processor;
scheduling, by the first processor, execution of one or more boot-up tasks by a second processor;
executing, by the second processor, the one or more boot-up tasks in the pre-boot environment;
executing, by the first processor, one or more additional tasks in parallel with the second processor executing the one or more boot-up tasks;
directing, by the second processor to the first processor, a service call related to the one or more boot-up tasks;
performing, by the first processor, a function corresponding to the service call; and
returning, by the first processor to the second processor, a result of the function, wherein the directing is performed using a first system table provided to the second processor, the first system table being configured to direct the service call on the second processor to a first entity running on the second processor, the first entity on the second processor being configured to communicate with a second entity running on the first processor, and wherein the performing and returning are performed using a second system table provided to the first processor, the second system table being configured to cause the second entity to perform the function corresponding to the service call and return the result of the function to the first entity.

16. The non-transitory computer readable storage medium of claim 15, wherein in the pre-boot environment an operating system is not executing on the SoC, and wherein the method further comprises:
completing executing in the pre-boot environment by loading the operating system; and
scheduling, by the operating system, execution of code on the first processor and the second processor in parallel.

17. The non-transitory computer readable storage medium of claim 15, wherein the second system table comprises a UEFI system table.

18. The non-transitory computer readable storage medium of claim 15, wherein the method further comprises:
receiving, by the second processor, the service call;
storing in a first buffer a first message corresponding to the service call;
setting, by the second processor, a first flag associated with the first buffer to indicate to the first processor the first buffer includes the first message;
determining, by the first processor, the first buffer includes the first message based on the first flag;
reading, by the first processor, the first message from the first buffer;
performing, by the first processor, the function corresponding to the service call based on the first message;
storing, by the first processor, in a second buffer, a second message corresponding to the result of the function;
setting, by the first processor, a second flag associated with the second buffer to indicate to the second processor the second buffer includes the second message;
determining, by the second processor, the second buffer includes the second message based on the second flag; and
reading, by the second processor, the second message from the second buffer.

19. The non-transitory computer readable storage medium of claim 15, wherein the service call comprises at least one of a memory allocation request, a call related to a verification of the second processor, or a call related to programming the SoC.

20. The non-transitory computer readable storage medium of claim 15, wherein the second processor and the first processor are configured to communicate using a shared memory space comprising one or more flags and one or more buffers associated with the one or more flags, wherein the one or more flags are used to synchronize passing of messages between the first and second processors.

21. The non-transitory computer readable storage medium of claim 20, wherein for each flag of the one or more flags, each of the plurality of computing cores is enabled to read the flag, and only one of the plurality of computing cores is enabled to write to the flag.

* * * * *